(12) United States Patent
Hershey et al.

(10) Patent No.: US 8,336,408 B2
(45) Date of Patent: Dec. 25, 2012

(54) QUICK DISCONNECT FIELD INSTRUMENT DISPLAY METER ASSEMBLY

(75) Inventors: George Hershey, Blue Bell, PA (US); Mark Striano, Horsham, PA (US); Rajender Singh, Maharashtra (IN)

(73) Assignee: Honeywell International Inc., Morristown, NJ (US)

( * ) Notice: Subject to any disclaimer, the term of this patent is extended or adjusted under 35 U.S.C. 154(b) by 288 days.

(21) Appl. No.: 12/876,434

(22) Filed: Sep. 7, 2010

(65) Prior Publication Data

US 2012/0055274 A1    Mar. 8, 2012

(51) Int. Cl.
G01D 7/00    (2006.01)
G01D 11/24   (2006.01)
H05K 13/04   (2006.01)
H05K 13/00   (2006.01)

(52) U.S. Cl. ............... 73/866.3; 29/523.01; 29/593

(58) Field of Classification Search ............... 73/866.3; 29/445, 453, 525–525.01, 593, 595, DIG. 105
See application file for complete search history.

(56) References Cited

U.S. PATENT DOCUMENTS

| | | | | |
|---|---|---|---|---|
| 2,985,978 | A * | 5/1961 | Breen et al. | 40/333 |
| 4,431,966 | A * | 2/1984 | Pucciarello | 324/114 |
| 4,478,521 | A * | 10/1984 | Evans et al. | 368/8 |
| 5,490,665 | A * | 2/1996 | Thiele et al. | 269/303 |
| 5,923,257 | A * | 7/1999 | Nolte | 340/584 |
| 6,526,653 | B1 * | 3/2003 | Glenn et al. | 29/453 X |
| 7,134,354 | B2 | 11/2006 | Nelson et al. | |
| 2008/0250858 | A1 * | 10/2008 | Park | 73/431 |
| 2011/0283812 | A1 * | 11/2011 | Huang et al. | 73/861.64 |

FOREIGN PATENT DOCUMENTS

| | | | | |
|---|---|---|---|---|
| DE | 29804930 U1 | * | 7/1998 | |
| FR | 2640747 A1 | * | 6/1990 | 73/1.73 |
| JP | 11211507 A | * | 8/1999 | |
| JP | 2005067297 A | * | 3/2005 | |
| JP | 2010112737 A | * | 5/2010 | |
| WO | WO 2009020257 A1 | * | 2/2009 | |
| WO | WO 2010032911 A1 | * | 3/2010 | |

OTHER PUBLICATIONS

Grammarist, Period—Grammarist, Period, 2 pages, http://grammarist.com/grammar/period/, downloaded Aug. 10, 2012, copyright 2012.*

* cited by examiner

Primary Examiner — Thomas P Noland
(74) Attorney, Agent, or Firm — Kermit D. Lopez; Luis M. Ortiz; Ortiz & Lopez, PLLC

(57) ABSTRACT

A quick disconnect field instrument display assembly for assembling a display meter with a communication module. A snap-fit locking feature and a tab each mounted on both sides of a display meter housing locks with a receptacle tab located on a communication module housing in order to rotate the display with 90° indexing (360° display rotation). A printed circuit board can be firmly snapped into the display meter housing with the snap-fit locking feature on both sides and a display unit can be mounted in parallel to the display meter housing in order to restrict movement of the printed circuit board. A snap feature located on the inner side of the communication module housing secures a communication board and a number of tabs on the communication module housing facilitate 360° rotation with respect to the display meter housing.

20 Claims, 4 Drawing Sheets

QUICK DISCONNECT FIELD INSTRUMENT DISPLAY METER ASSEMBLY

TECHNICAL FIELD

Embodiments are generally related to field instruments. Embodiments are also related to display meters. Embodiments are additionally related to the configuration and assembly of field instruments, such as display meters.

BACKGROUND OF THE INVENTION

Field instruments can be employed to monitor and control process parameters (e.g., pressure, mass flow rate, volume flow rate, temperature, etc.) in various industrial processes such as, for example, oil refineries, food manufacturing plants, paper pulp preparation facilities, and many others. A remote unit such as a process transmitter, for example, can be connected to or can communicate with the process in order to obtain and transmit information related to the process variable to a control room. In some instances, it is desirable for an operator to view information directly from the process transmitter. Such measured process variables or other information related to the transmitter can be directly displayed via a display meter located on a face of the transmitter.

Most prior art field instrument display meters require a rotational action in order to assemble the display meter in association with a communication module. Such an approach requires only a cable connection for connecting the display meter with the communication module in order to provide the rotational action with respect to the display meter. Additionally, the prior art display meters typically include one or more fasteners for mounting a printed circuit board (PCB) and other electronic assemblies with respect to the display meter. Such approaches, however, are time consuming and increases assembly complexity and are not sufficiently customized to thoroughly evaluate the merits of a particular product.

Based on the foregoing, it is believed that a need exist for an improved quick disconnect field instrument display meter assembly. A need also exists for assembling the display meter with a communication module that facilitates 360° rotation, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved quick disconnect field instrument display assembly.

It is another aspect of the disclosed embodiments to provide for an improved method for assembling a display meter with a communication module that facilitates 360° rotation.

It is a further aspect of the disclosed embodiments to provide an improved method for securely mounting a PCB with respect to the display meter.

The aforementioned aspects and other objectives and advantages can now be achieved as described herein. A quick disconnect display meter assembly for connecting a display meter with a communication module is disclosed herein. A snap-fit locking feature and a tab each mounted on both sides of a display meter housing locks with a receptacle tab located on the communication module housing in order to rotate the display with 90° indexing (360° display rotation). A printed circuit board can be firmly snapped into the display meter housing with the snap-fit locking feature on both sides and a display unit (e.g., LCD) can be mounted in parallel to the display meter housing in order to restrict the movement of the printed circuit board. A snap feature located on the inner side of the communication module housing secures a communication board and a number of tabs on the communication module housing facilitate 360° rotation with respect to the display meter housing.

A tapered portion located on the locking feature provides an easy entry with respect to the communication module and the snap-fit locking feature on both sides of the display meter can be pressed to remove the display meter. The snap-fit locking feature of the display meter creates an additional force on the display meter housing in order to restrict the movement of the printed circuit board. A transmitter cap can be placed over the snap-fit locking feature that does not permit the display meter to disassemble. Such an assembly provides a quick assembly/disassembly of the display meter with respect to a transmitter unit in a wide variety of field instruments by eliminating a rotational action and a fastener unit with respect to the display meter.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
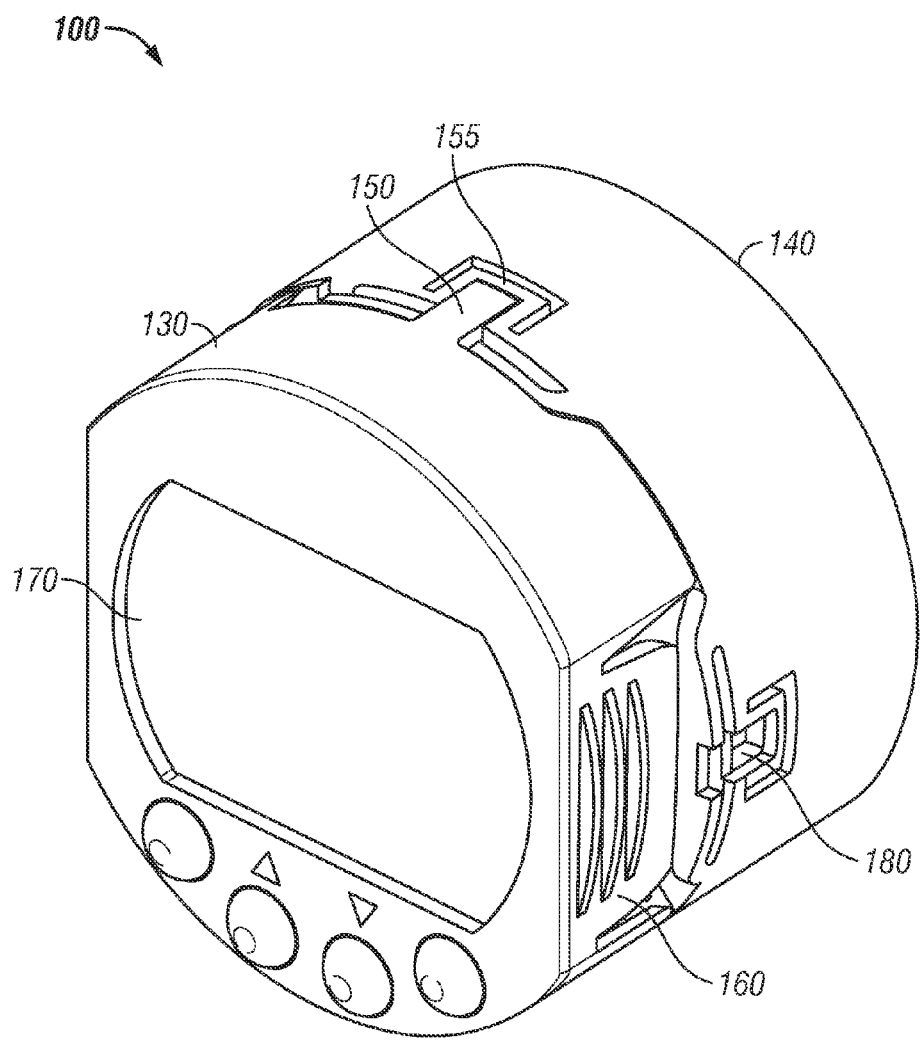
FIG. 1 illustrates a perspective view of a quick disconnect display meter assembly, in accordance with the disclosed embodiments.

FIG. 1 illustrates a perspective view of a quick disconnect display meter assembly 100, in accordance with the disclosed embodiments. The quick disconnect display meter assembly 100 provides a quick assembly/disassembly of a display meter with respect to a field instrument. The display meter assembly 100 can be located on a transmitter of the field instrument for measuring a wide variety of process variables. The display meter assembly 100 generally includes a display meter housing 130 that can be operatively configured in association with a communication module housing 140 of a field instrument in order to display process parameters such as, for example, temperature, pressure, and other parameters with respect to the field instrument.

The display meter housing 130 and the communication module housing 140 described herein may be configured from a material such as, for example, plastic, depending upon design considerations. It can be appreciated that other types of materials may be utilized in place of the suggested material. The display meter housing 130 generally includes a display unit 170, a tab 150, and a snap-fit locking feature 160 each located on both sides of the display meter housing 130. The communication module housing 140 includes a receptacle tab 155 for coupling the display meter housing 130 with the communication housing 140 and carries out communications with the display meter housing 130. Note that the display unit 170 can be, for example, a liquid crystal display, depending upon design considerations.

Figure 2:
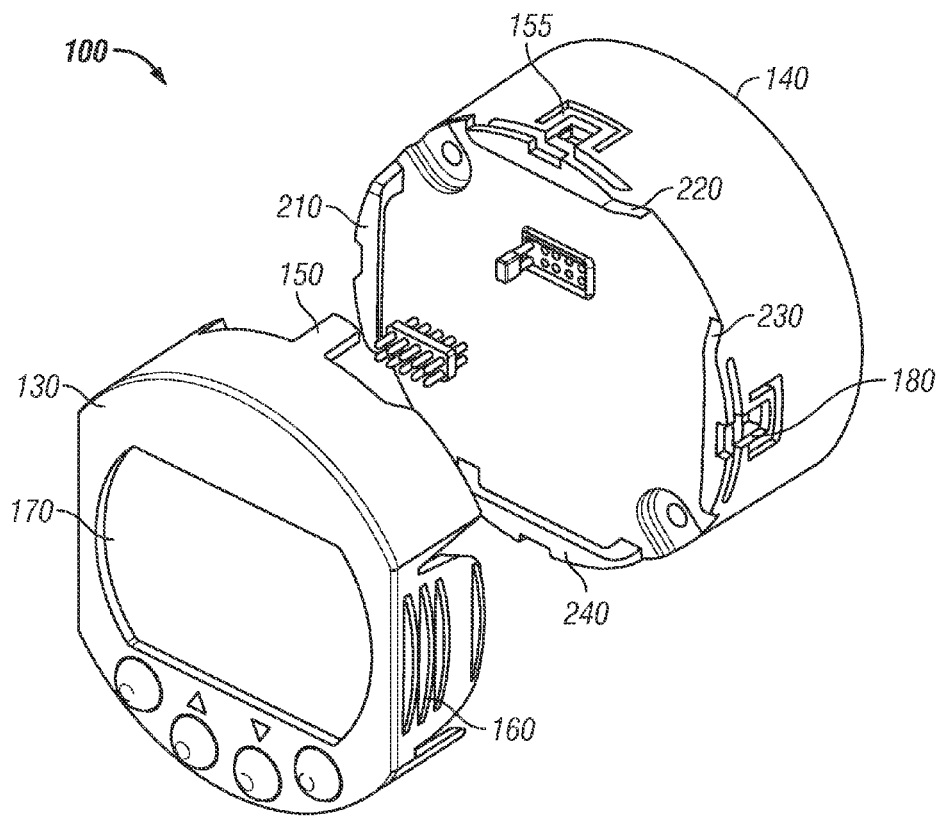
FIG. 2 illustrates an exploded view of the quick disconnect display meter assembly, in accordance with the disclosed embodiments.

FIG. 2 illustrates an exploded view of the quick disconnect display meter assembly 100, in accordance with the disclosed embodiments. Note that in FIGS. 1-6, identical or similar blocks are generally indicated by identical reference numerals. The snap-fit locking feature 160 and the tab 150 each mounted on both sides of the display meter housing 130 locks with the receptacle tab 155 located on the communication module housing 140 in order to rotate the display meter housing 130 with 90° indexing (360° display rotation).

Figure 3:
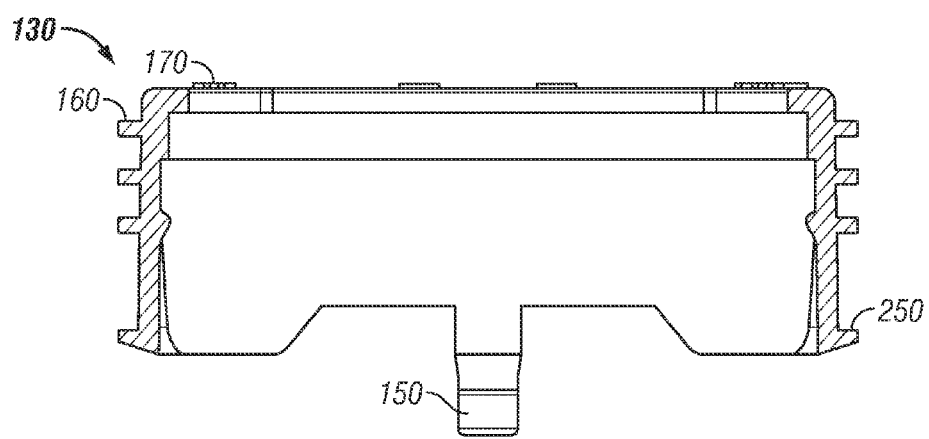
FIG. 3 illustrates cross-sectional view of a display meter housing, in accordance with the disclosed embodiments.

FIG. 3 illustrates a cross-sectional view of the display meter housing 130, in accordance with the disclosed embodiments. A tapered portion 250 located on the locking feature 160 provides an easy entry of the display meter housing 130 with respect to the communication module housing 140. The locking feature 160 on both sides of the display meter housing 130 can be pressed to remove the display meter housing 130 locks. A number of tabs 210, 220, 230, and 240 located on the communication module housing 140 facilitate the 360 degree rotation (90 degree indexing) of the display meter housing 130.

Figure 4:
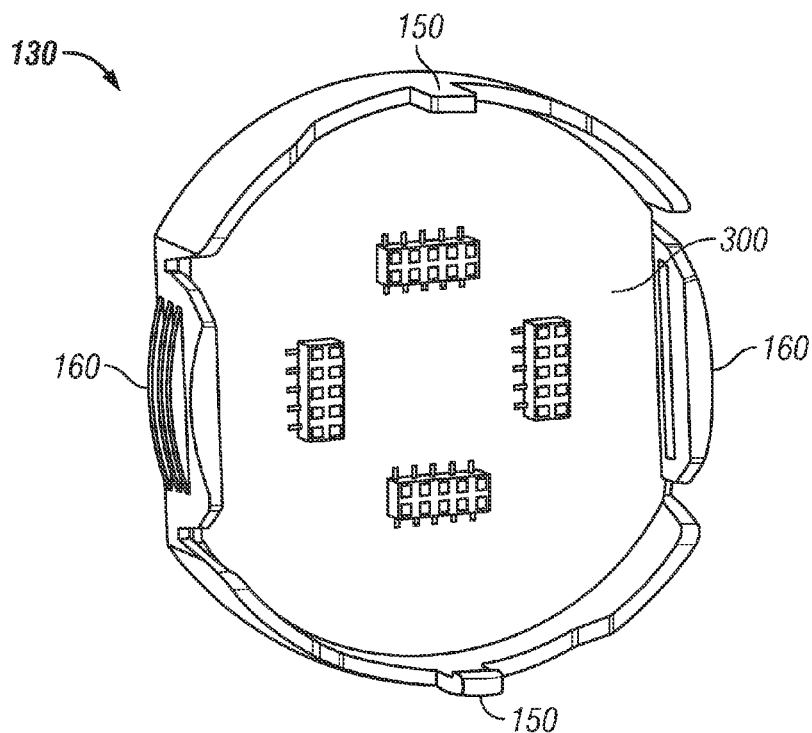
FIG. 4 illustrates a perspective view of a printer circuit board located on the display meter housing, in accordance with the disclosed embodiments.

FIG. 4 illustrates a perspective view of a PCB (Print Circuit Board) 300 located on the display meter housing 130, in accordance with the disclosed embodiments. The PCB 300 mechanically and electrically connect electronic components utilizing conductive pathways, tracks, or signal traces etched from copper sheets laminated onto a non-conductive substrate. The PCB 300 consists of an insulator (e.g., fiberglass) with threads of conductive material serving as wires on the base of the board 300. The printed circuit board 300 can be firmly snapped into the display meter housing 130 with the snap-fit locking feature 160 on both sides. The display unit 170 can be mounted parallely on the display meter housing 130 in order to restrict the movement of the printed circuit board 300. The snap-fit locking feature 160 of the display meter housing 130 creates an additional force on the display meter housing 130 in order to restrict the movement of the printed circuit board 300.

Figure 5:
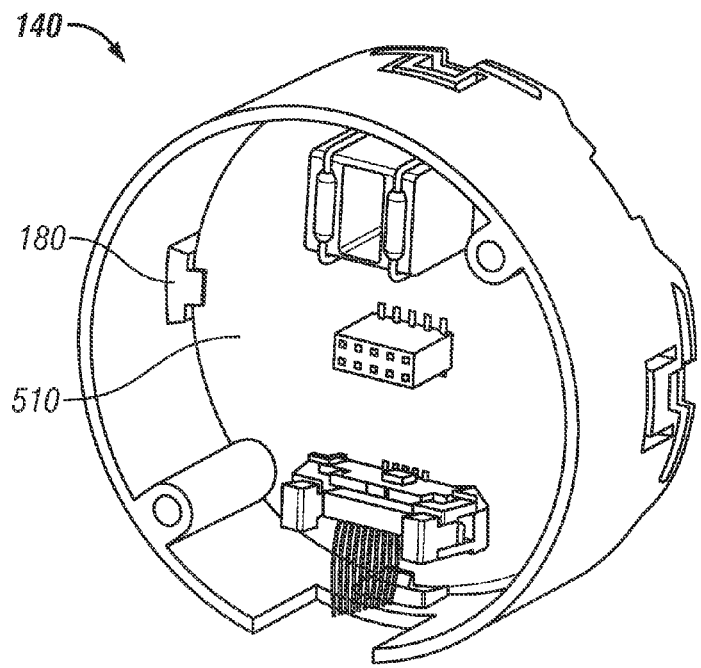
FIG. 5 illustrates a perspective view of a communication board located on a communication module housing, in accordance with the disclosed embodiments.

FIG. 5 illustrates a perspective view of a communication board 510 located on the communication module housing 140, in accordance with the disclosed embodiments. A snap feature 180 located on the inner side of the communication module housing 140 secures the communication board 510 in association with the communication module housing 140. The communication board 510 can perform high-speed communications in order to transmit large capacity data between electronic devices. The communication module housing 140 can be a transmitter comprising a data transfer line for transferring digital data, a number of interfaces connected to the external devices in one-by-one correspondence, and constructed so as to fit to transmission speeds peculiar to the plurality of the field instruments respectively. The communication board 510 can be configured to execute a frequency modulation to synchronize the digital data, which typically possess natural transmission speeds on respective interfaces and displays respective outputs on to the display unit 170 associated with the display meter housing 130.

Figure 6:
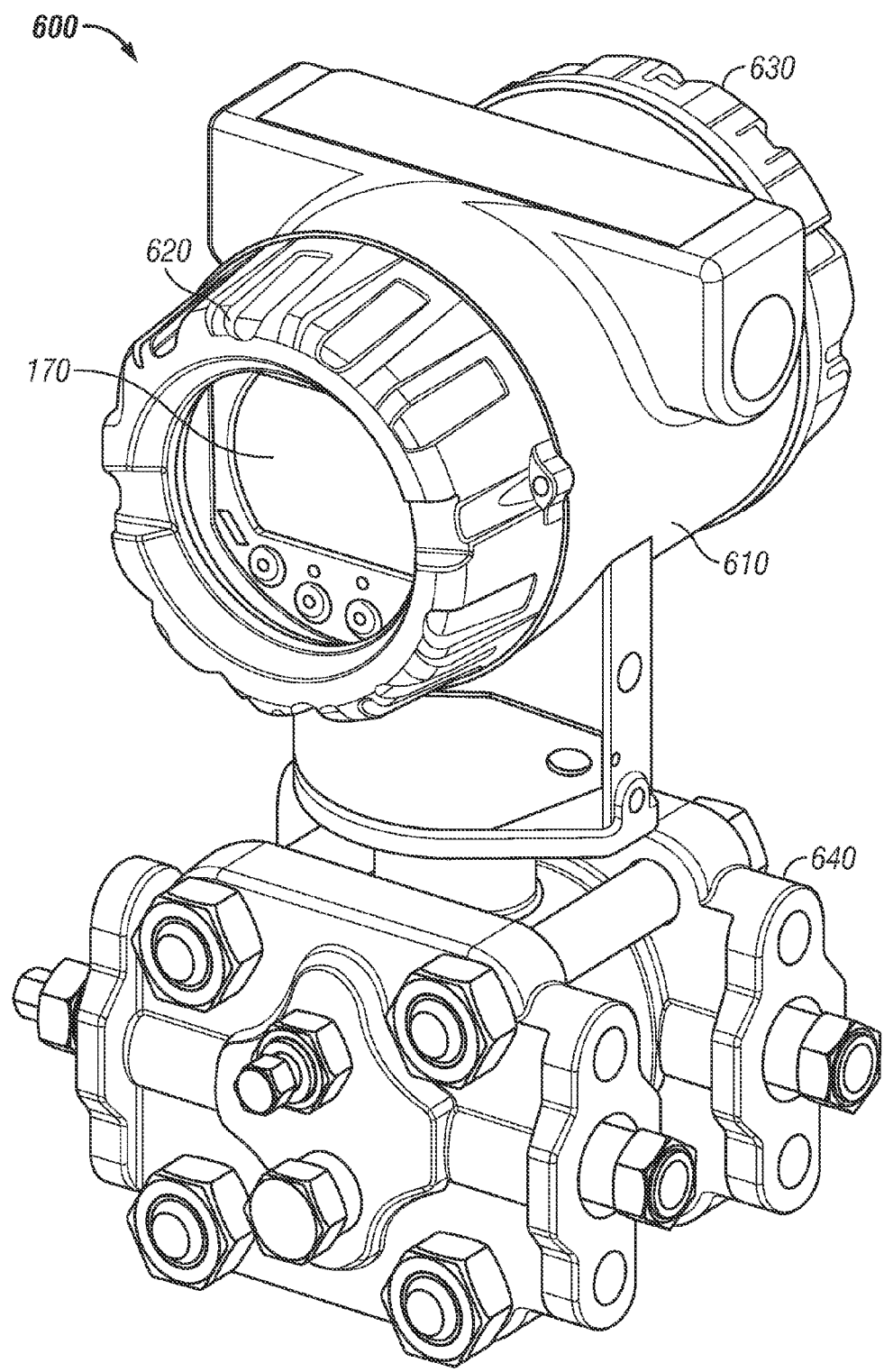
FIG. 6 illustrates a perspective view of a transmitter connected with the display meter and the communication module, in accordance with the disclosed embodiments.

FIG. 6 illustrates a perspective view of a transmitter 600 connected with the display meter housing 130 and the communication module housing 140. Note that the embodiments discussed herein generally relate to a particular transmitter configuration. It can be appreciated, however, that such embodiments can be implemented in the context of other process control instrumentation (including any process device which is located in the field such as control elements) in which it is desirable to display information. The transmitter 600 includes a transmitter housing 610 coupled to a sensor 640 in order to measure the process variables and provide an output to the communication module housing 140. The transmitter housing 610 can be further sealed with a transmitter cap 620 and an end cap 630. The transmitter cap 620 can be placed over the snap-fit locking feature 160 that does not permit the display meter housing 130 to disassemble.

The display meter housing 130 associated with the transmitter 600 provides quick disconnect interface with 90 degree indexing (360 degree rotation). The transmitter cap 620 can have a clear window such that the display unit 170 can be viewed externally. The information regarding the process variables can then be displayed in a standard form across the width of the display unit 170. Such an assembly provides a quick assembly/disassembly of the display meter with respect to a transmitter unit in a wide variety of field instruments by eliminating a rotational action and a fastener with respect to the display meter. Note in general that the locking feature 160 can be actuated by finger pressure, for example, to allow for removal/assembly in 90-degree increments. The tab 150 is unable to disassemble when the transmitter cap 620 is installed.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A quick disconnect display meter apparatus, comprising:
   a locking mechanism and a tab each mounted on each side of a display meter housing that connects with a receiving mechanism located on a communications module housing in order to rotate said display meter housing with a 90 degree indexing;
   a printed circuit board connected to said display meter housing with said locking mechanism on said each side of said display meter;
   a display unit mounted in parallel to said display meter housing and which restricts a movement of said printed circuit board; and
   a plurality of tabs located on said communications module housing to facilitate a 360-degree rotation with respect to said display meter housing.

2. The apparatus of claim 1 further comprising a snap feature located on an inner side of said communications module housing, said snap feature securing a communication board mounted on said communications housing module.

3. The apparatus of claim 1 wherein said locking mechanism comprises a snap-fit locking feature.

4. The apparatus of claim 3 wherein said snap-fit locking feature creates an additional force on said display meter housing in order to restrict a movement of said printed circuit board.

5. The apparatus of claim 3 further comprising a transmitter cap placed over said snap-fit locking feature does not permit said tab from being disassembled from said communications module.

6. The apparatus of claim 1 wherein said receiving mechanism comprises a receptacle tab.

7. The apparatus of claim 1 further comprising:
a tapered portion located on the said locking mechanism to provide an accessible entry with respect to said communications housing module, said locking mechanism pressed on said each side to disassemble said display meter from said communications housing module.

8. The apparatus of claim 1 further comprising a transmitter unit coupled to said display meter housing and said communications module housing to provide a quick assembly/disassembly of said display meter housing.

9. The apparatus of claim 1 wherein said display meter housing comprises a plastic material.

10. The apparatus of claim 1 wherein said display unit comprises a LCD display.

11. A quick disconnect display meter apparatus, comprising:
a locking mechanism and a tab each mounted on each side of a display meter housing that connects with a receiving mechanism located on a communications module housing in order to rotate said display meter housing with a 90 degree indexing;
a printed circuit board connected to said display meter housing with said locking mechanism on said each side of said display meter;
a display unit mounted in parallel to said display meter housing and which restricts a movement of said printed circuit board;
a plurality of tabs located on said communications module housing to facilitate a 360-degree rotation with respect to said display meter housing; and
a snap feature located on an inner side of said communications module housing, said snap feature securing a communication board mounted on said communications housing module.

12. The apparatus of claim 11 wherein said locking mechanism comprises a snap-fit locking feature.

13. The apparatus of claim 12 wherein said snap-fit locking feature creates an additional force on said display meter housing in order to restrict a movement of said printed circuit board.

14. The apparatus of claim 12 further comprising a transmitter cap placed over said snap-fit locking feature does not permit said tab from being disassembled from said communications module.

15. The apparatus of claim 11 further comprising a transmitter unit coupled to said display meter housing and said communications module housing to provide a quick assembly/disassembly of said display meter housing.

16. The apparatus of claim 11 wherein said receiving mechanism comprises a receptacle tab.

17. The apparatus of claim 11 further comprising:
a tapered portion located on the said locking mechanism to provide an accessible entry with respect to said communications housing module, said locking mechanism pressed on said each side to disassemble said display meter from said communications housing module.

18. A method of configuring a quick disconnect display meter apparatus, said method comprising:
mounting a locking mechanism and a tab on each side of a display meter housing that connects with a receiving mechanism located on a communications module housing in order to rotate said display meter housing with a 90 degree indexing;
connecting a printed circuit board to said display meter housing with said locking mechanism on said each side of said display meter;
locating a display unit in parallel to said display meter housing and which restricts a movement of said printed circuit board; and
placing a plurality of tabs on said communications module housing to facilitate a 360-degree rotation with respect to said display meter housing.

19. The method of claim 18 further comprising locating a snap feature on an inner side of said communications module housing, said snap feature securing a communication board mounted on said communications housing module.

20. The method of claim 18 further comprising:
configuring said locking mechanism to comprise a snap-fit locking feature; and
configuring said receiving mechanism to comprise a receptacle tab.

* * * * *